US012807519B2

(12) United States Patent
Dourbal

(10) Patent No.: US 12,807,519 B2
(45) Date of Patent: Nov. 24, 2026

(54) WATER PURIFICATION DEVICE

(71) Applicant: Pavel Dourbal, Princeton Junction, NJ (US)

(72) Inventor: Pavel Dourbal, Princeton Junction, NJ (US)

( * ) Notice: Subject to any disclaimer, the term of this patent is extended or adjusted under 35 U.S.C. 154(b) by 356 days.

(21) Appl. No.: 18/647,956

(22) Filed: Apr. 26, 2024

(65) Prior Publication Data

US 2024/0368002 A1 Nov. 7, 2024

Related U.S. Application Data

(60) Provisional application No. 63/464,314, filed on May 5, 2023.

(51) Int. Cl.

*C02F 1/30* (2023.01)
*C02F 1/00* (2023.01)
*C02F 1/02* (2023.01)
*C02F 101/36* (2006.01)

(52) U.S. Cl.

CPC ................ *C02F 1/30* (2013.01); *C02F 1/008* (2013.01); *C02F 1/02* (2013.01); *C02F 2101/36* (2013.01); *C02F 2209/40* (2013.01); *C02F 2301/046* (2013.01); *C02F 2303/04* (2013.01)

(58) Field of Classification Search

CPC .... C02F 1/30; C02F 1/008; C02F 1/02; C02F 2101/36; C02F 2209/40; C02F 2301/046; C02F 2303/04

See application file for complete search history.

(56) References Cited

U.S. PATENT DOCUMENTS 5,200,068 A * 4/1993 Andelman ............. B01D 15/36 204/647
2013/0299090 A1* 11/2013 Saitoh .................. H05H 1/2406 315/111.21
2019/0365083 A1* 12/2019 Qiu ........................ B01D 61/10
2020/0071199 A1* 3/2020 Lewis, III ................ H05H 1/48
(Continued)

FOREIGN PATENT DOCUMENTS

CN 202968231 U * 6/2013
CN 110015729 A * 7/2019 ................ C02F 1/48
(Continued)

OTHER PUBLICATIONS

CN111003868A Machine Translation (Year: 2020).*
(Continued)

*Primary Examiner* — Benjamin L Lebron
*Assistant Examiner* — Mahmoud Motaz Abdel Latif
(74) *Attorney, Agent, or Firm* — Larisa Migachyov

(57) ABSTRACT

A water purification device and method are described. The device comprises at least two compartments separated by a wall, wherein the wall comprises a small hole. An electrode is placed in each compartment and an alternating current is applied across them; the high current density in the hole boils the water and the current ionizes the water vapor into plasma, which then purifies the water; however, the current density outside the hole in the compartments is not high enough to boil the water. A flow control module causes water to flow through the hole at a particular flow rate. As the water flows out of the hole, it cools down due to contact with the water in the second compartment.

20 Claims, 7 Drawing Sheets

(56) References Cited

U.S. PATENT DOCUMENTS

Figure 1:
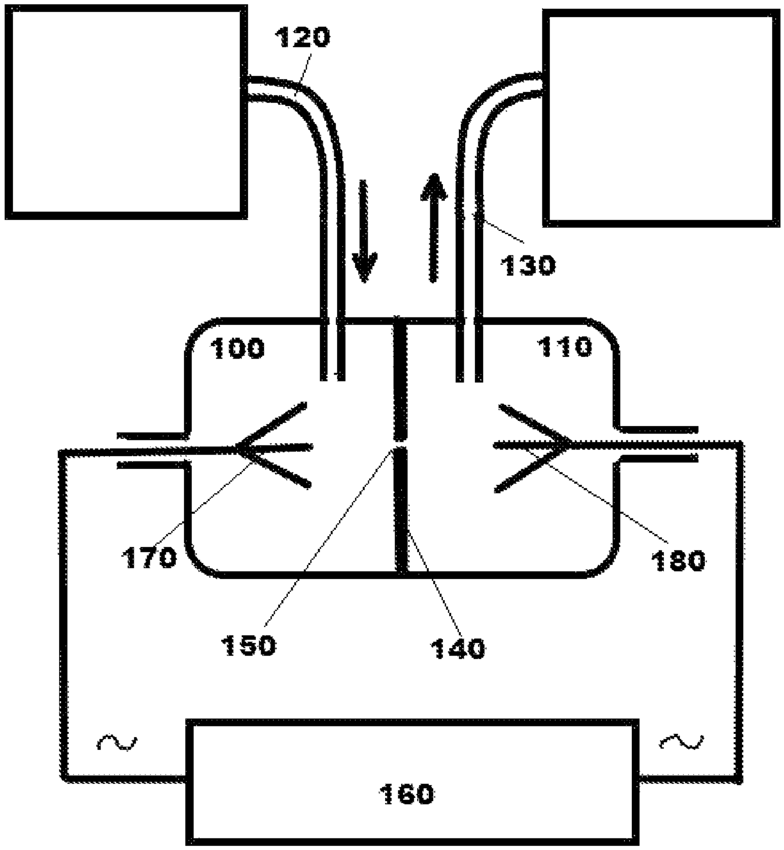

| | | | | |
|---|---|---|---|---|
| 2021/0395124 | A1* | 12/2021 | Park | B01D 61/16 |
| 2022/0081328 | A1* | 3/2022 | Hanke | B01D 53/225 |

FOREIGN PATENT DOCUMENTS

| | | | | | |
|---|---|---|---|---|---|
| CN | 111003868 | A | * | 4/2020 | C02F 9/00 |
| KR | 100422108 | B1 | * | 3/2004 | G01F 23/706 |
| KR | 100597503 | B1 | * | 7/2006 | C02F 1/46114 |
| KR | 20150068579 | A | * | 6/2015 | C02F 1/4608 |
| KR | 20160146922 | A | * | 12/2016 | C02F 1/78 |
| WO | WO-2015164760 | A1 | * | 10/2015 | C02F 1/4608 |

OTHER PUBLICATIONS

KR20160146922A Machine Translation (Year: 2016).*
CN110015729A Machine Translation (Year: 2019).*
CN_202968231_U Machine Translation (Year: 2013).*
KR20150068579A Machine Translation (Year: 2015).*
KR100422108B1 Machine Translation (Year: 2004).*
KR100597503B1 Machine Translation (Year: 2006).*

* cited by examiner

WATER PURIFICATION DEVICE

CROSS-REFERENCE TO RELATED APPLICATIONS

The present application takes priority from Provisional App. No. 63/464,314, filed May 5, 2023, which is herein incorporated by reference.

BACKGROUND

Field of the Invention

The present invention generally relates to water purification methods and devices, and more specifically relates to water purification devices that use plasma to break up PFAS contamination in water.

Background of the Invention

Water purity is an important issue for maintaining human health and the environment. Unfortunately, much of the drinking water in the United States and elsewhere is severely contaminated with heavy metals, organic pollutants, and other substances that are harmful to human health. One of the categories of pollutants that is ubiquitous, harmful to human health, and difficult to remove from drinking water, is a group of per- and polyfluoroalkyl substances (PFAS). These are manufactured chemicals that have been used in industry and consumer products since the 1940's; there are thousands of different PFAS. These chemicals break down very slowly and therefore build up in people, animals, and the environment over time. Exposure to certain levels of PFAS may lead to decreased fertility, high blood pressure in pregnant women, developmental effects in children, increased risk of some cancers, decreased immune system function, interference with the body's natural hormones, increased cholesterol levels, and increased risk of obesity.

It is therefore very important to remove PFAS from drinking water; however, PFAS compounds do not break down very easily. Conventionally available activated-carbon filters, widely used in many pitcher, refrigerator, and faucet-mounted water purification systems, do not always provide consistent removal of PFAS compounds; in some cases, they actually increase PFAS amounts in the water.

Plasma processes are known as a method of purifying water. To perform water purification using plasma, an electrical current is applied to steam to generate plasma. The plasma then generates various reactive oxygen species, such as OH radicals, H2O2, and O3. These reactive species can sterilize the water by killing microorganisms, and break up PFAS compounds, pharmaceutical residue, and other organic pollutants within the water.

However, the devices used to purify water by plasma generation are frequently cumbersome and complex and not suitable for consumer use. Many of these devices use a lot of energy in order to create plasma throughout the water container. Furthermore, the process of plasma creation overheats the water, which means it needs to be cooled down to be made usable. All of this renders these devices unsuitable for being used in a consumer context.

Also, because the electrodes used in conventional plasma-based water purification systems are at such a high voltage, they wear out and release metal ions into the water. This results in less acceptable water and the recurring costs of replacing the electrodes.

A need exists for a simple and effective way to remove PFAS contamination and other contaminants from water in a way that can be done at a consumer's home.

SUMMARY OF THE INVENTION

An object of the present invention is to provide a water purification device that uses plasma to purify water and that is simple and compact.

Another object of the present invention is to provide a water purification device that uses plasma to purify water while the majority of the water remains cool.

Another object of the present invention is to provide a water purification device that uses plasma to purify water without using excessive energy to do so.

In an aspect of the present invention, a water purification device is provided. The water purification device comprises a container of water and a partition placed in the water in such a way as to separate it into a first and second volume of water. The partition is nonconductive, waterproof, and capable of withstanding temperatures up to about 300 °C. The partition also comprises a small hole through which water can flow, and a flow control module that causes water to flow through the hole. A power supply delivers alternating current at a specified current and voltage in such a way as to create alternating current between the first and second volume of water. The current and voltage is such that the current density in the first and second volumes of water is not enough to boil the water, while the current density in the hole is such that the water boils and then transitions into a plasma state. This results in a bubble of plasma forming around the hole, which purifies the water as it flows through the hole.

In an aspect of the invention, the partition is an integral part of the container and the entire container is made of a nonconductive material. The power supply is connected to the water via a first and second electrode immersed in the water, one in the first volume and one in the second volume; each of the electrodes has a surface area that is larger than the cross-sectional area of the hole.

In an embodiment, the power supply provides between 1200 and 2000 watts, and the voltage between the electrodes is between 4 kV and 10 kV.

In an embodiment, the partition comprises more than one hole, with the total cross-sectional area of the holes being such that the water passing through the holes transitions into a plasma state while the water in the first and second volume of water does not boil.

In an embodiment, the flow control module causes water to flow through the hole at approximately 0.2 L/min.

In an embodiment, the partition is made of quartz glass, silicon glass, or ceramic.

In an embodiment, the device further comprises a sensor that is configured to determine the strength of the plasma state of the water passing through the hole, and wherein either the flow control module is configured to change the flow rate based on the strength of the plasma state, or the power supply is configured to change the voltage level based on the strength of the plasma state.

In an embodiment, the device comprises a second partition comprising a second hole, wherein the two partitions separate the water in the container into three volumes of water and the water flows from the first to the second volume and then from the second to the third. The power supply is connected to all three volumes of water and delivers a high voltage to the second volume of water while keeping the first and third volumes of water at ground electric potential. The three volumes of water can be located vertically above each other so that water flows upward from the first volume to the second and from the second to the third due to thermal expansion; in this embodiment, the device also comprises a recirculating channel to return the water from the third to the first volume of water, and the device may also comprise a cooling feature to cool the water in the recirculating channel.

The diameter and length of the hole may be optimized to maximize the strength of the plasma within the hole. In another embodiment, the voltage or the flow rate or both may be optimized to maximize the strength of the plasma within the hole.

In an embodiment, the second volume of water is enclosed in a container that is entirely submerged within the first volume of water, with two partitions located in such a way that water flows into the container through the hole in the first partition and flows out of the container through the hole in the second partition. The power supply is connected to the first and second volumes of water in such a way that the first volume of water is at ground electrical potential and there is an alternating current delivered from the second to the first volume of water, wherein the voltage and current levels are such that the water passing through the holes transitions into a plasma state, while the water in the second volume of water does not boil.

In an embodiment, the container is a pipe through which water passes and the partition is a cylindrical disc separating the input pipe from the output pipe. In an embodiment, a middle pipe made of a nonconductive material may be located between the input pipe and the output pipe and a partition is placed at each end of the middle pipe. The water in the input pipe and the output pipe is then kept at ground electric potential while the water in the middle pipe is kept at a high voltage level.

The power supply may connect to the middle pipe via an opening in the pipe through which an electrode is inserted, or via a conductive washer located next to the partition in the water.

In an embodiment, the middle pipe is conductive and electrically separated from the input and output pipes by non-conductive spacers. This enables the power supply to connect to the water in the middle pipe via the conductive wall of the middle pipe.

LIST OF FIGURES

Figure 2:
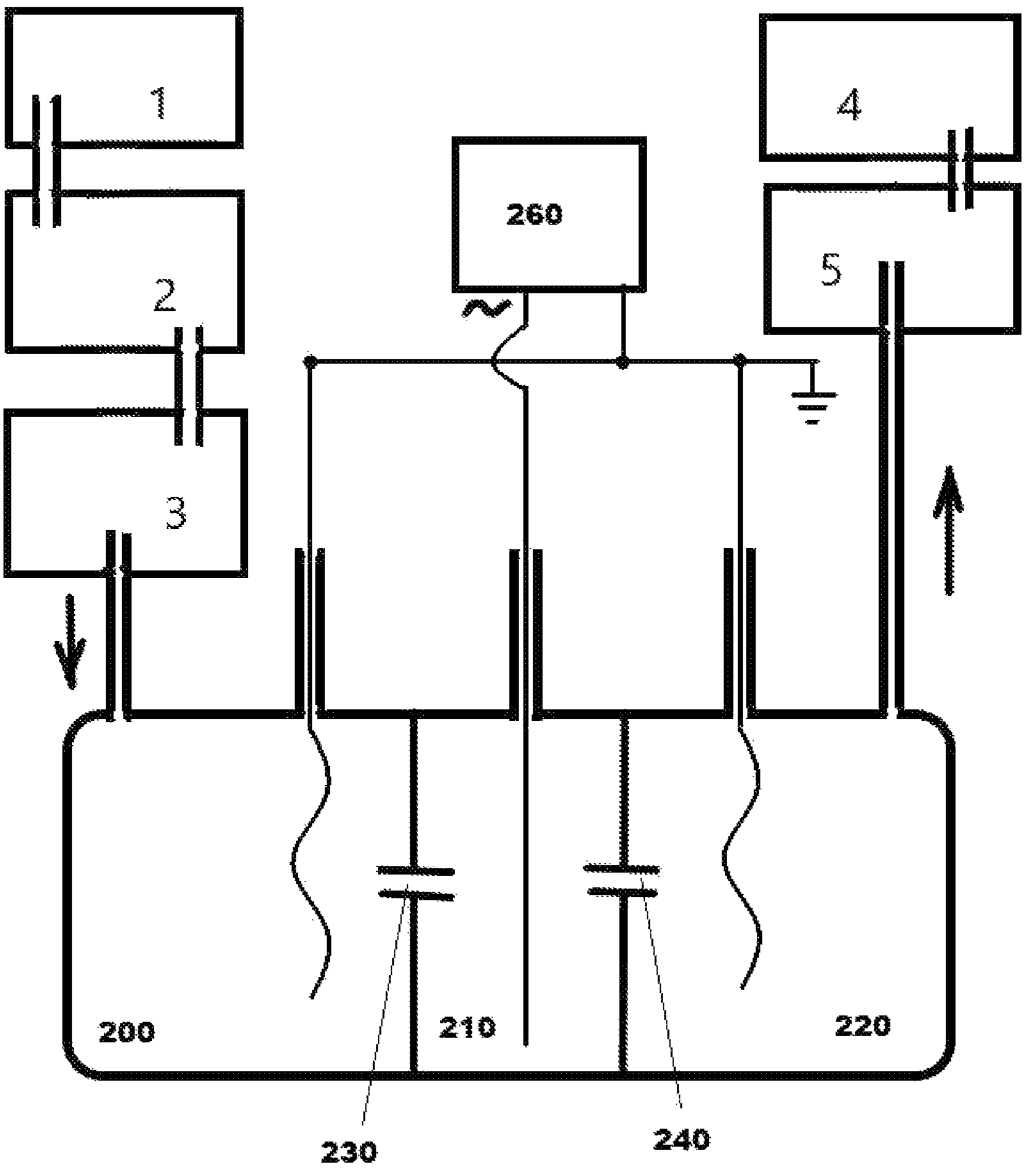
Figure 3:
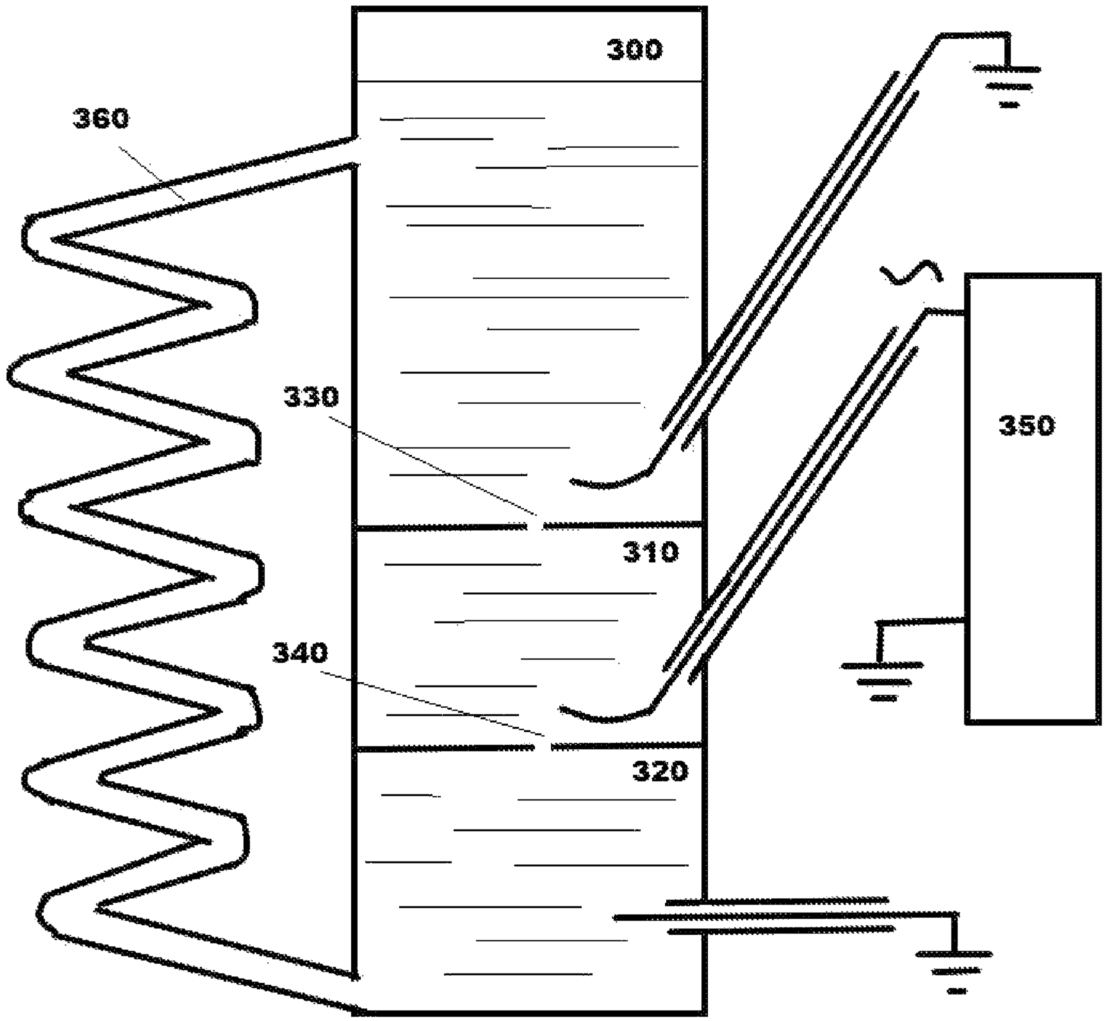
Figure 4:
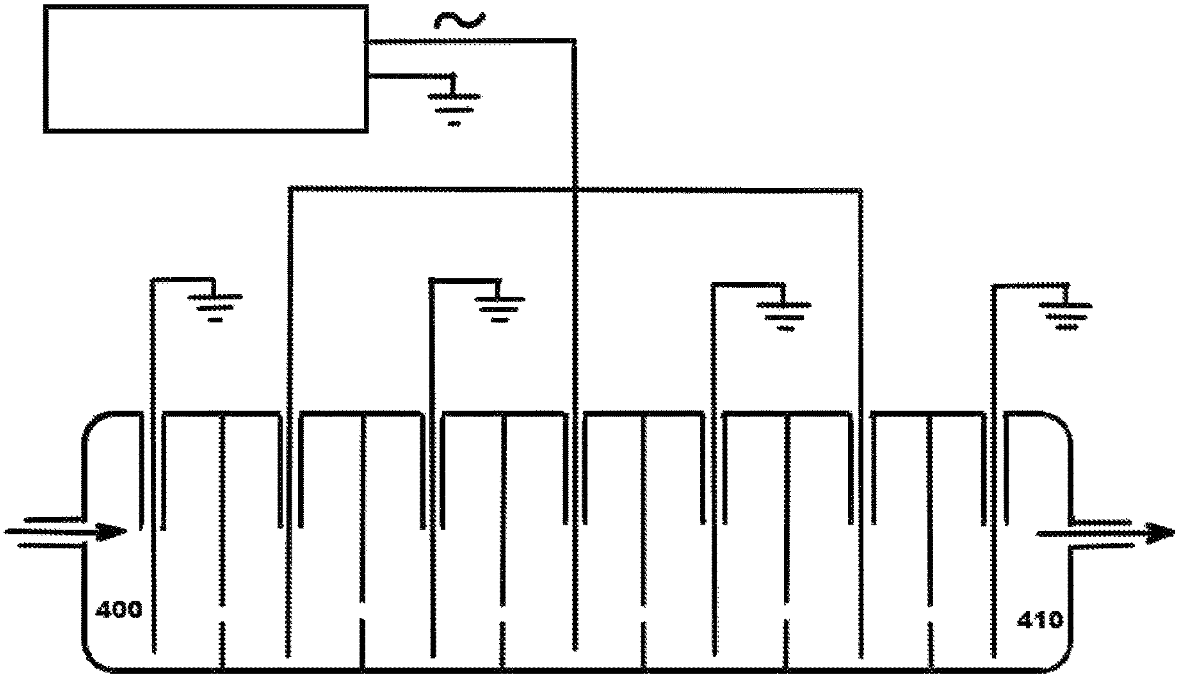
Figure 5:
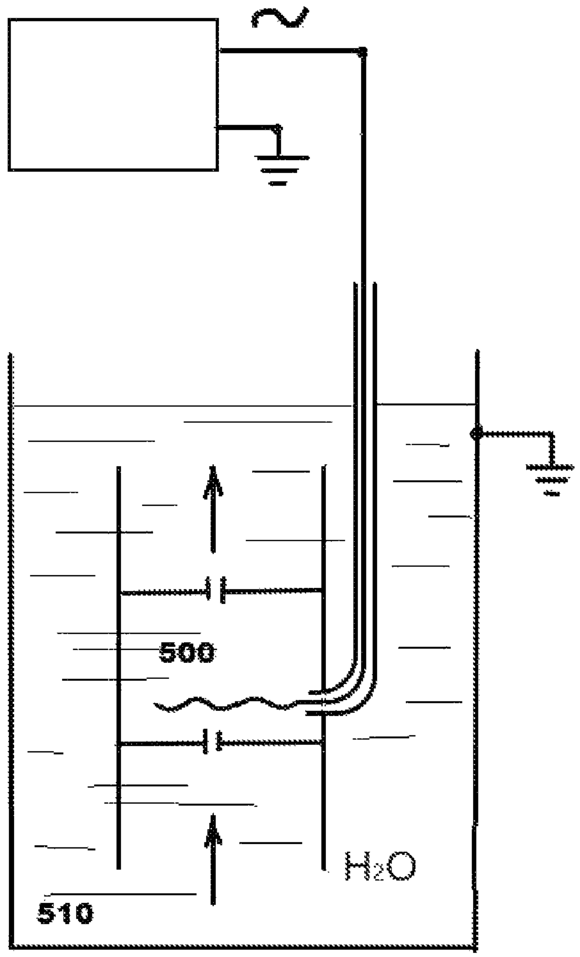
Figure 6:
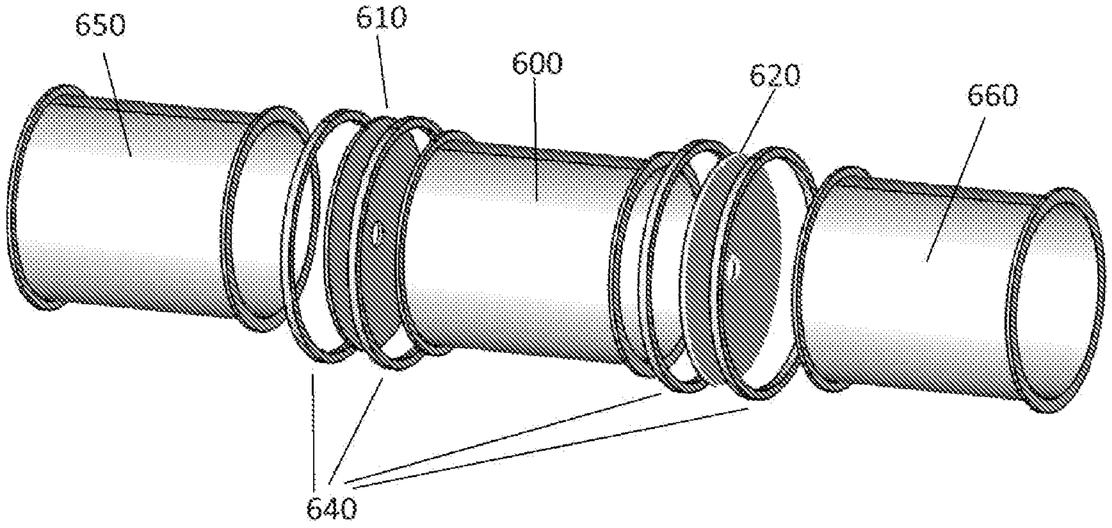
Figure 7:
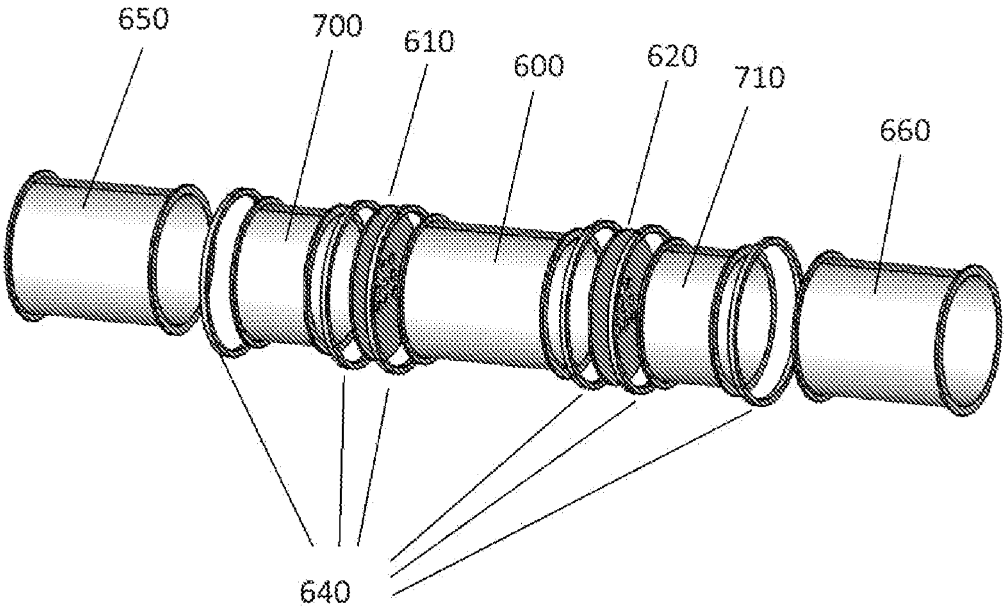

FIG. 1 shows an embodiment of the present invention.
FIG. 2 shows an embodiment of the present invention.
FIG. 3 shows an embodiment of the present invention.
FIG. 4 shows an embodiment of the present invention.
FIG. 5 shows an embodiment of the present invention.
FIG. 6 shows an embodiment of the present invention.
FIG. 7 shows an embodiment of the present invention.

DETAILED DESCRIPTION

While several embodiments are described below, it is to be understood that reasonable equivalents to the elements described in the present disclosure are also incorporated into the present invention, as apparent to a person of reasonable skill in the art.

The present invention is a system intended to purify water using plasma without using a lot of energy. In its most basic form, water is passed through a small hole at a slow flow rate, and alternating current is applied to it—the alternating current is such that the current density outside the small hole is not enough to boil or ionize the water, while the current density inside the hole can boil it and create plasma. Thus, a small bubble of plasma is formed around the hole, and the water that passes through the hole is purified. This means that a relatively low amount of power is sufficient to generate the plasma, and that the water outside the hole is not overheated and does not require as much cooling to be usable. At the same time, the plasma is sufficient to kill microorganisms and degrade PFAS compounds and other pollutants.

FIG. 1 shows a diagram of the most basic embodiment of the present invention. A water container is provided comprising two compartments 100 and 110 separated by a wall 140. There is a small hole 150 in the wall 140. The compartments 100 and 110 and the wall 140 are all made of a non-conductive material such as quartz or silicon glass, ceramic, or other non-conductive material with good thermal conductivity and thermal-shock resistivity.

A flow control module directs water through the inlet pipe 120 into the first compartment, after which it passes through the hole 150 into the second compartment 110 and through the outlet pipe 130. Electrodes 170 and 180 are located in each one of the compartments 100 and 110, respectively. For each electrode, the surface area of the electrode is greater than the cross-sectional area of the hole, as will be discussed below. Power supply 160 is connected to electrodes 170 and 180 and delivers alternating current to them.

In brief, the operation of an embodiment of the present invention is as follows. The flow control module provides a constant water flow through the hole from the first compartment to the second compartment. The power supply provides an electric field gradient between the two electrodes through the water. Due to the difference in cross-sectional area between the compartments and the hole, the current density within each compartment is low and the current density inside the hole is very high-especially since the electrode surface area in the water is much larger than the cross-sectional area of the hole. Because of this, the water in the hole starts boiling and bubbles of steam are created.

Due to the ability of the power source to provide a rapid increase in electric field gradient within the bubbles, as soon as steam bubbles appear, they are ionized and a corona discharge is formed in each bubble. At the same time, the bubbles increase in volume and merge, forming a larger bubble inside and immediately around the hole. The power supply provides the conditions for the formation and maintenance of plasma in this bubble. As the water flows through the hole, it condenses in the second compartment, but the plasma bubble stays around the hole.

Since plasma breaks down organic compounds such as PFAS or pharmaceutical residues and kills microorganisms, the water that passes into the second compartment is purified and suitable for consumption. Also, since only the water passing through the hole is heated, energy consumption is low.

In an embodiment, a flow control module is used to control the flow rate of the water through the hole. The flow control module can be any type of pump that ensures the correct flow rate. As described below, the flow rate may be controlled in order to optimize the level of plasma forming at the hole. In an embodiment, the flow rate is set at approximately 0.2 L/min.

In an embodiment (as shown and discussed below), gravity is used instead of a flow control module.

In an embodiment, the outlet pipe is connected to the inlet pipe so that water circulates through the system more than once. This ensures better water purification.

Each compartment has a metal electrode located internally in such a way that they are in contact with the water. The surface area of each electrode has to be larger than the cross-sectional area of the hole; the surface area has to be large enough to ensure that the water contacting the electrode does not boil, while the hole has to be small enough to ensure a current density inside the hole that will boil the water. The two electrodes are connected to an alternating-current power supply with ballast, built as described in U.S. Pat. No. 9,343,996, which is herein incorporated by reference. In an embodiment, the power levels are adjusted based on the strength of the plasma within the hole.

The hole is preferably between 2 mm and 8 mm diameter, and has a length (i.e. wall thickness) between 0.5 and 15.0 mm. The exact dimensions of the hole may be optimized so that at a given flow rate, electrode diameter and length, ambient temperature, water temperature, and power level, the optimal amount of plasma forms in the hole. Alternately, for any given hole dimensions (length and diameter), the flow rate and power level may be optimized.

In an embodiment, multiple holes are used. In this embodiment, the total cross-sectional area of all the holes has to be less than the total surface area of each electrode. The holes may be placed anywhere on the wall as long as water can flow through them.

Appendix 1 provides a sample Octave script for calculating system parameters to maximize the power in the hole and thus optimize plasma generation. It is to be understood that other programming languages may be used to execute similar scripts, and the sample script and values provided in it are not meant to be limiting.

The sample script provides four different values that may be maximized. The hole dimensions may be optimized to maximize the power levels in the hole, to maximize the energy levels in the hole, to maximize the diameter, or to minimize the length of the hole. Choosing to maximize the power results in the most power going into the plasma in the hole; choosing to maximize the energy results in the most energy going into the plasma over a period of time (which would result in different hole dimensions from the option to maximize power); choosing to maximize the diameter of the hole ensures that there is a good flow; and choosing to minimize the length ensures that the wall is not too thick.

The operation of the sample script is briefly summarized below. The input parameters used are the ambient water temperature (the colder the water, the more energy it takes to generate a corona discharge at the hole), the required water flow rate, the maximum power supply power rating, the electrode diameter and length, and the input (mains) voltage. The script also uses the specific heat capacity of water, the electrical resistivity of the water (which is different depending on whether it is deionized water, drinking water, or sea water), and the minimal and maximal dimensions for the hole diameter and length.

The script initially prompts a user to select which criterion should be optimized. In this embodiment, one of the following four criteria may be selected-power, energy, hole diameter, or hole length (i.e. wall thickness).

The script then normalizes the input parameters and calculates the required temperature rise for the water in the hole to initiate a plasma corona discharge. Then, the script assigns initial values for hole dimensions and power.

Next, the script calculates the energy and power going into the water in the hole based on the initial values for the optimization criteria, and determines the "voltage budget" necessary to produce plasma in the hole given the current constraints. If the voltage budget is zero or less, it is impossible to produce plasma in the hole given the constraints, and the device will not work. If the voltage budget is greater than zero, the program script finds optimal values to maximize either the energy or the power going into the hole, to maximize the diameter of the hole, or to minimize its length, depending on user needs.

It must be noted that the plasma purification method and system here does not depend on the volume of the water container. The only relevant parameter here is the volume of the water within the hole and the flow rate. As long as the current density within the container (but outside the hole) is not enough the boil the water outside the hole, the container can be any size.

The voltage provided by the electrodes is preferably 4-10 kV, and is alternating current. Providing direct current would electrolyze the water, which is not desirable for the present invention. The power supply provides about 1200-2000 watts, and provides a ballast for stabilization. Since plasma varies in impedance from a short-circuit to infinite resistance, the power supply needs to adjust accordingly and not limit the process of ionization, so that the plasma can be sustained. The process for regulating the power supply to sustain the plasma is described in U.S. Pat. No. 9,343,996, and is not a novel part of the present disclosure.

In an embodiment, a third electrode can be added next to the plasma to incorporate an infusion of metal into the water. The third electrode may be made of a metal that is important for human health, such as silver or copper.

In an embodiment, a sensor can be used to determine the strength of the plasma and adjust the voltage and flow rate accordingly. Any sensor may be used to measure plasma intensity for the present invention, as long as it is useful for measuring the properties of a very small volume of plasma and can be done non-invasively. For example, passive spectroscopic methods such as Doppler shift, Doppler broadening, Stark effect, Stark broadening, spectral line ratios, or the Zeeman effect may be used; or active spectroscopic methods such as absorption spectroscopy, beam emission spectroscopy, charge exchange recombination spectroscopy, laser-induced fluorescence, or any other method that can be used for measuring plasma intensity. In an embodiment, a photo-sensor is used.

It is to be understood that the present invention may be practiced in any water container setup in which it is possible for water to pass through a nonconductive partition via a hole and an alternating current to be applied to the water in the abovedescribed way. While the below embodiments are some of the ways the present invention may be practiced, they are not meant to be limiting.

FIG. 2 shows an embodiment of the invention comprising two walls and 3 compartments. In this embodiment, the middle compartment 210 is kept at a high voltage while the first compartment 200 and the second compartment 220 are kept at ground electric potential. Plasma is produced at both the first hole 230 and the second hole 240. A photo-sensor (not shown) is connected to the control unit 260. The control unit controls the flow rate and the voltage to ensure that an adequate level of plasma is maintained; the photo-sensor is used to measure plasma intensity to provide the control unit with this information. In an embodiment, a temperature sensor is also used to provide information to the control unit. The temperature sensor is used to determine plasma temperature to determine its power and provide this information to the control unit for regulating plasma intensity.

FIG. 3 shows a freestanding embodiment of the present invention where water circulates due to gravity. As in the previous embodiment, the middle compartment 310 is kept at a high voltage while the top and bottom compartments are kept at ground; each compartment comprises an electrode and they are connected to the power supply 350. Both the first hole 330 and the second hole 340 produce plasma, which purifies the water. As the plasma heats the water, it rises from the bottom compartment 300 to the middle compartment 310, and from the middle compartment 310 to the top compartment 320. A recirculating channel 360 moves water from the top compartment 300 to the bottom compartment 320 to start the cycle over again. This embodiment may be used as a tea kettle that can both treat and boil the water at the same time; in an alternate embodiment, the recirculating channel 360 comprises a cooling feature to cool the water. In an embodiment, a separate heater is used to heat the water so that it rises faster, and control the flow rate this way.

FIG. 4 shows an embodiment comprising multiple compartments for better efficiency. In this embodiment, the first compartment 400 and the last compartment 410 are at ground potential, and all or most of the adjacent sections are at different potentials to ensure that each hole experiences a voltage gradient. This embodiment of the invention accommodates as many compartments as required; the number of compartments is only limited by the available space and power. The multi-stage process provides better water purification.

FIG. 5 shows a submersible embodiment. Here, the high voltage compartment 500 is submerged in a much larger water tank or similar vessel 510. The water tank 510 is kept at ground potential. This embodiment may be used for continuous water treatment in large water tanks or water heating systems. The volume of the tank or the high voltage compartment do not matter for the purposes of this invention, as the only relevant parameters are the diameter and length of the hole and the current density outside and inside the hole. As long as the current density outside the hole is not enough to boil the water while the current density inside the hole is enough to produce plasma, the invention will work to purify the water.

The present invention works well to destroy PFAS and microplastics present in water, kill bacteria and viruses, and produce PW (purified water). It may be used as an entire purification system in itself, a part of one, or simply as a water treatment method for physically modifying the composition of water.

In any of the abovedescribed embodiments that comprise inlet and outlet pipes, the compartments directly connected to those pipes can be kept at ground electrical potential to ensure safety from electrocution.

While the abovedescribed embodiments show the water container as a single entity separated by a wall, it is also possible to practice this invention by simply adapting a pipe through which water can flow. In this embodiment, as shown in FIG. 6, a non-conductive disc 610 (for example, quartz glass) is placed in the path of a water conduit in such a way as to block it completely. The disc contains a hole (or multiple holes) through which water can flow. The water flows through a middle pipe section 600 and then through another disc 620. The water conduit is constructed in such a way as to electrically insulate one side of the disc from the other—in the embodiment shown in the FIG. 6, non-conductive gaskets 640 may be used to connect two separate pipes around each non-conductive disc, so that the input pipe 650, the middle pipe 600, and the output pipe 660 are not electrically connected. Then an electrical potential is applied to the water in the middle pipe 600 while the water in the input pipe 650 and the output pipe 660 is kept at ground. The electrical potential may be applied to the outside of a metal pipe or to the inside of a glass pipe via a separate exit tube (not shown). The middle pipe 600 is nonconductive while the input and output pipes are conductive. In an embodiment, the middle pipe 600 is made of glass. Because the input and output pipes are kept at ground, the risk of electrocution is low.

In an embodiment shown in FIG. 7, the middle pipe 600 is conductive and nonconductive spacers 700 and 710 separate it from the input pipe and output pipe. This way, the electrical potential can be connected to the outside of the middle pipe, which simplifies the design. FIG. 7 shows the non-conductive discs 610 and 620 with multiple holes. It is understood that this embodiment of the invention does not require multiple holes and can be practiced with non-conductive discs with only one hole.

Sanitary pipe fittings, for example food-grade pipe fittings, may be used for these embodiments of the present invention. All the fittings and gaskets have to be able to withstand a temperature of up to 300 °C. The non-conductive disc can be a fused quartz ground and polished disc, with a 2" diameter and a 1⁄16" thickness, with one or more holes drilled into it at any position on its surface. The gasket may be a standard 0.064" thickness 2" diameter O-ring for a tri-clamp fitting. The non-conductive pipe section can be a 2" tri clamp Hop Bong Sight Glass; such devices are used in fermentation. An electrically conductive pipe section can be a Sanitary Spool Tube with a 2" tri clamp round ferrule. A sanitary tri-clamp can be used to connect the different sections of the device together.

Exemplary embodiments are described above. It will be understood that other embodiments of the present invention also exist and that reasonable equivalents to the embodiments described above are also incorporated into the present disclosure.

The invention claimed is:

1. A water purification device, comprising:

a partition comprising a hole between 2 mm and 8 mm in diameter, wherein the partition is made of a material that is waterproof, non-conductive, and capable of withstanding temperatures up to approximately 300 °C, wherein the partition comprises a first side and a second side;

a container configured to hold water, said container containing water;

wherein the partition is placed in the container in such a way as to separate the water into a first volume of water on the first side of the partition and a second volume of water on the second side of the partition, wherein the container is configured in such a way that the first volume of water is electrically insulated from the second volume of water;

a flow control module connected to the container in such a way as to cause water to flow through the hole from the first side of the partition to the second side of the partition;

a power supply for delivering alternating current at a specified current level and voltage;

wherein the power supply is connected to the first volume of water and the second volume of water in such a way as to cause alternating current to flow between the first volume of water and the second volume of water;

wherein the specified current level and voltage and the hole dimensions are such that the water passing through the hole boils and transitions into a plasma state, while the water in the first volume of water and the second volume of water does not boil.

2. The water purification device of claim 1, wherein the partition is an integral part of the container, wherein the container is made of a non-conductive material;

wherein the power supply is connected to the first volume of water and the second volume of water via a first electrode and a second electrode, wherein the first electrode is placed into the first volume of water and the second electrode is placed into the second volume of water;

wherein each of the first electrode and the second electrode has a surface area that is larger than the cross-sectional area of the hole.

3. The water purification device of claim 1, wherein the specific voltage is between approximately 4 kV and 10 kV, and wherein the power supply provides between 1200 and 2000 watts.

4. The water purification device of claim 1, further comprising at least one second hole, wherein the total cross-sectional area of the first hole and the at least one second hole is such that water passing through the holes transitions into a plasma state while the water in the first volume of water and the second volume of water does not boil.

5. The water purification device of claim 1, wherein the flow control module causes water to flow at approximately 0.2 L/min.

6. The water purification device of claim 1, wherein the partition is made of at least one of the list comprising: quartz glass, silicon glass, ceramic.

7. The water purification device of claim 1, further comprising a sensor that is configured to determine a strength of the plasma state of the water passing through the hole, wherein the flow control module is configured to change the specific flow rate depending on the strength of the plasma state.

8. The water purification device of claim 1, further comprising a sensor that is configured to determine a strength of the plasma state of the water passing through the hole, wherein the power supply is configured to change the voltage level depending on the strength of the plasma state.

9. The water purification device of claim 1, further comprising:

a second partition comprising a second hole, wherein the second partition is placed into the second volume of water so as to separate it into a second volume of water and a third volume of water, wherein the flow control module causes water to flow from the first volume of water to the second volume of water through the hole and from the second volume of water to the third volume of water through the second hole, wherein the second hole is similar in shape and cross-sectional area to the hole;

wherein the power supply is connected to the third volume of water;

wherein the power supply is configured to deliver high voltage to the second volume of water and to keep the first and third volumes of water at ground electric potential.

10. The water purification device of claim 9, wherein the first volume of water is located vertically above the second volume of water and the second volume of water is located vertically above the third volume of water, further comprising:

a recirculating channel connecting the first volume of water and the third volume of water.

11. The water purification device of claim 10, further comprising a cooling feature connected to the recirculating channel that cools the water in the recirculating channel.

12. The water purification device of claim 1, wherein the diameter and length of the hole are such as to maximize the strength of the plasma within the hole.

13. The water purification device of claim 1, wherein at least one of the following parameters is such as to maximize the strength of the plasma within the hole: voltage, flow rate.

14. The water purification of claim 1, wherein the second volume of water is enclosed in a container that is entirely submerged within the first volume of water, wherein the partition is an integral part of the container, further comprising:

a second partition that is an integral part of the container, comprising a second hole, wherein the second partition is located in such a way that water flows from the first volume of water into the second volume through the hole and from the second volume of water to the first volume of water through the second hole;

wherein the power supply is connected to the first volume of water and the second volume of water in such a way as to keep the first volume of water at ground electric potential and deliver alternating current at a specific current level and specific voltage to the second volume of water;

wherein the specific voltage and the specific current are such that the water passing through the holes transitions into a plasma state, while the water in the second volume of water does not boil.

15. The water purification device of claim 1, wherein the container is a cylindrical pipe comprising an input pipe and an output pipe, wherein the partition is a cylindrical disc separating the input pipe from the output pipe.

16. The water purification device of claim 9, wherein the container is a cylindrical pipe comprising an input pipe, an output pipe, and a middle pipe, wherein the partition is placed between the input pipe and the middle pipe and the second partition is placed between the middle pipe and the output pipe, wherein the middle pipe is made of a nonconductive material.

17. The water purification device of claim 9, wherein the container is a cylindrical pipe comprising an input pipe, an input transition spacer, an output pipe, an output transition spacer, and a middle pipe, wherein the input transition spacer is connected between the input pipe and the middle pipe and the output transition spacer is connected between the middle pipe and the output pipe, wherein the partition is placed between the input transition spacer and the middle pipe and the second partition is placed between the middle pipe and the output transition spacer, wherein the middle pipe is made of a conductive material and the input transition spacer and output transition spacer are made of a nonconductive material.

18. The water purification device of claim 16, wherein the power supply is connected to the second volume of water via an electrode, wherein the middle pipe comprises an opening through which an electrode is inserted.

19. The water purification device of claim 16, wherein the power supply is connected to the second volume of water via a conductive washer inserted into the middle pipe, wherein the conductive washer is connected to the power supply.

20. The water purification device of claim 17, wherein the power supply is connected to the second volume of water via the conductive wall of the middle pipe.

* * * * *